Dec. 4, 1928.
G. W. BENEDICT
1,694,052
BRAKE DRUM
Filed Oct. 19, 1926
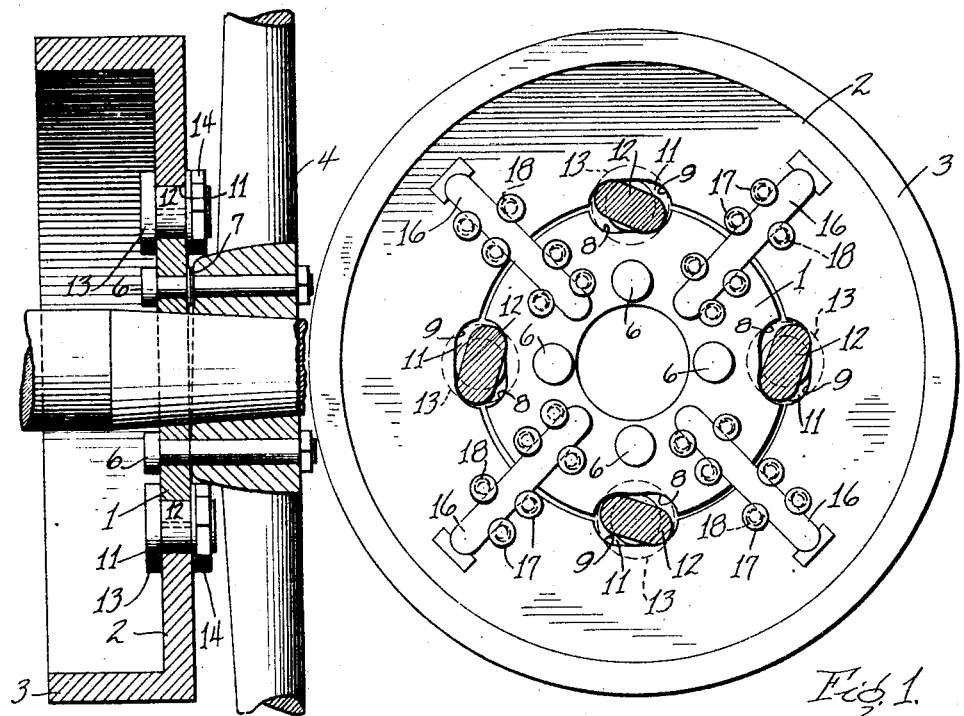
Fig. 1.
Fig. 2.
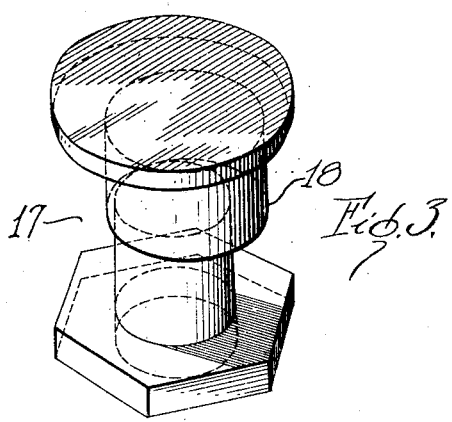
Fig. 3.
INVENTOR
G. W. BENEDICT
BY
ATTORNEY Patented Dec. 4, 1928.

1,694,052

UNITED STATES PATENT OFFICE.

GEORGE W. BENEDICT, OF OAKLAND, CALIFORNIA, ASSIGNOR, BY MESNE ASSIGNMENTS, TO MARION EZELL, OF OAKLAND, CALIFORNIA.

BRAKE DRUM.

Application filed October 19, 1926. Serial No. 142,546.

The present invention relates to improvements in brake drums and its particular object is to provide a brake drum in which the repairs and adjustments may be easily effected. It is particularly proposed in the present invention to provide a brake drum that is made of more than one piece, viz: a master piece that may be permanently secured to the hub of a motor vehicle and a ring element adapted to encircle the master element and to be secured thereto in adjusted relation. It will be noted that in the assembling of this brake drum, the periphery of the drum may be positioned relative to the axis of the wheel for insuring true concentric relation before the ring element is fastened to the master element so that the adjustment may be absolutely perfect. This method of making the brake drum in more than one piece has the further advantage that the master section may be permanently secured to the wheel while the brake section or rim section may be easily removed for the purpose of effecting repairs or may be replaced by a new similar element. In this connection, I wish to state that in dividing the brake drum into two or more elements, it is not absolutely necessary that the division line be made along peripheral lines but might be made along radial lines, probably with results equally as satisfactory.

The preferred form of my invention is illustrated in the accompanying drawing in which—

Figure 1 shows an inside view of a brake drum constructed in accordance with my invention, Figure 2 a transverse section thru the same showing part of the hub of a wheel, and Figure 3 a perspective detail view of a clamping element.

While I have shown only the preferred form of the invention, I wish to have it understood that various changes or modifications may be made within the scope of the claims hereto attached without departing from the spirit of the invention.

In its preferred form, my brake drum comprises two sections, an inner section 1 made in the form of a disc and an outer section 2 made in the form of a ring having a flange 3 extending from the outer periphery thereof which latter flange constitutes the brake face of the device.

The disc 1 may be fastened to the hub of the wheel 4 in the customary manner by a plurality of bolts 6. While this disc is fastened to the hub of the wheel, it is preferably trued so as to occupy an angle of 90 degrees relative to the axis of the wheel by means of shims 7 introduced between the disc and the hub in proper places.

The ring element 2 is made sufficiently large to encircle the disc 1 with freedom of considerable play, and the disc and the ring are formed with registering recesses in their confronting faces as shown at 8 and 9 which form oblong holes 11 when the two pieces are assembled and are adapted to receive within the same the cams 12 provided with heads 13 at one end and adapted to have nuts 14 threaded thereon at the opposite end. It will be noted that by means of these cams, the outer ring section may be adjusted to a nicety until its periphery is exactly concentric with the axis of the wheel.

In order to hold the outer section in its adjusted position against the tremendous pressure brought to bear thereon by the application of the brakes, I provide an additional locking means in the form of a plurality of radial bars 16 adapted to lie against the faces of the two elements and to be firmly clamped in place by means of bolts 17 extending thru perforations in the outer and inner sections respectively and adapted to have their heads tightened upon the bars by means of nuts threaded on the bolts from the opposite side of the brake drum. It will be noted that the bolts are arranged in close proximity to the bars and are provided, where they engage the bars, with cam faces 18 which engage the side faces of the bars and allow the latter to be firmly clamped against lateral movement.

The manner of assembling my brake drum should be readily understood from the foregoing description. First, the disc 1 is fastened to the hub of the wheel by means of the bolts 6 and during this operation the disc is trued relative to the axis of the wheel by means of shims 7. The ring 3 is then placed around the disc and its periphery adjusted by means of the cams 12 to be exactly concentric relative to the axis of the wheel. In this position, the cams are locked by tightening the nuts 14 upon the same. Next, the bars 16 are put in their respective places, the bolts 17 are inserted in the perforations provided therefor and the nuts applied from the opposite face until the heads of the bolts come in contact with the upper faces of the bars. After sufficient frictional resistance has been created for preventing the bolt from playing too freely, the latter is turned to press the cam face 18 against the side face of the bar whereupon the nut on the opposite side is further tightened until the bar is absolutely and firmly held against lateral motion by the cam faces of the bolt and against motion away from the face of the drum by the heads of the bolts. The two elements of the brake drum are now united into one solid unit in which the face of the brake drum is exactly concentric to the axis of the wheel and in which the disc 1 is trued so that the active face of the brake drum also runs absolutely parallel to the axis of the wheel. It should be noted that the heads 13 of the cam 12 and the heads of the bolts 17 might be made square to facilitate the handling of the same.

I claim:

1. A brake drum comprising a master member, an active brake element, adjustable means for positioning one relative to the other and means for securing the one to the other in adjusted position.

2. A brake drum comprising a master member, an active brake element complementary thereto with considerable freedom of play between the same, means for positioning one relative to the other and means for securing the first one to the second one in adjusted position.

3. A brake drum comprising a disc shaped master member, a flanged ring complementary thereto with considerable freedom of play between the same, means for positioning one relative to the other and means for securing the ring to the master member in adjusted position.

In testimony whereof I affix my signature.

GEORGE W. BENEDICT.